United States Patent [19]
Zmudzinski et al.

[11] Patent Number: 6,088,500
[45] Date of Patent: *Jul. 11, 2000

[54] EXPANDED MODE WAVE GUIDE SEMICONDUCTOR MODULATION

[75] Inventors: Charles A. Zmudzinski, South Union, Ky.; Doyle T. Nichols, Redondo Beach, Calif.

[73] Assignee: TRW Inc., Redondo Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/826,989

[22] Filed: Apr. 11, 1997

[51] Int. Cl.$^7$ ................................. G02B 6/10; G02F 1/03
[52] U.S. Cl. ................................. 385/131; 385/2; 385/3; 359/248; 372/50
[58] Field of Search ............................ 385/1–9, 131, 385/24; 372/50, 45; 359/248, 245

[56] References Cited

U.S. PATENT DOCUMENTS

| | | | |
|---|---|---|---|
| 4,525,687 | 6/1985 | Chemla et al. | 332/7.51 |
| 4,847,573 | 7/1989 | Fukuzawa et al. | 332/7.51 |
| 4,936,645 | 6/1990 | Yoon et al. | 350/96.14 |
| 4,984,861 | 1/1991 | Suchoski, Jr. et al. | 350/96.11 |
| 5,067,828 | 11/1991 | Sullivan et al. | 385/3 |
| 5,088,099 | 2/1992 | Chen et al. | 372/45 |
| 5,107,307 | 4/1992 | Onose et al. | 357/4 |
| 5,113,283 | 5/1992 | Sugawara | 359/248 |
| 5,165,105 | 11/1992 | Haase et al. | 385/8 |
| 5,208,183 | 5/1993 | Chen et al. | 437/129 |
| 5,261,017 | 11/1993 | Melman et al. | 385/38 |
| 5,278,926 | 1/1994 | Doussiere | 385/28 |
| 5,402,259 | 3/1995 | Lembo et al. | 359/245 |
| 5,475,777 | 12/1995 | Imoto et al. | 385/28 |
| 5,479,539 | 12/1995 | Goldsmith et al. | 385/1 |
| 5,488,679 | 1/1996 | Wu | 385/15 |
| 5,517,589 | 5/1996 | Takeuchi | 385/24 |
| 5,522,005 | 5/1996 | Moretti et al. | 385/129 |
| 5,530,580 | 6/1996 | Thompson et al. | 359/248 |
| 5,694,504 | 12/1997 | Yu et al. | 385/3 |
| 5,771,257 | 6/1998 | Takiguchi et al. | 385/2 |

OTHER PUBLICATIONS

Koch, T. L., et al. "Tapered Waveguide InGaAs/InGaAsP Multiple–Quantum–Well Lasers". *IEEE Photonics Technology Letters*, vol. 2, No. 2, Feb. 1990, pp. 88–90.

Chin, Mee K., et al. "Theoretical Design Optimization of Multiple–Quantum–Well Electroabsorption Waveguide Modulators". *IEEE Journal of Quantum Electronics*, vol. 29, No. 9, Sep. 1993, pp. 2476–2488.

Khan, M. N., et al. "Quantum Well Electron Transfer Waveguide with High Coupling Efficiency to Single–Mode Fiber". *IEEE Photonics Technology Letters*, vol. 7, No. 2, Feb. 1995, pp. 194–196.

*Primary Examiner*—Hemang Sanghavi
*Attorney, Agent, or Firm*—Michael S. Yatsko

[57] ABSTRACT

An electroabsorptive modulator (EAM) for providing RF modulation of optical inputs signals. The EAM is formed as a semiconductor waveguide on a semiconductor substrate with an optical input port and an optical output port and electrical contacts for connection to the RF input. The configuration of the waveguide portion of the EAM is optimized to provide a modal match with the particular optical device to which the EAM is to be connected, for example, an optical fiber. By optimizing the modal match between the EAM and the optical device to which the EAM is connected, the optical insertion losses are minimized thereby improving the overall performance of the optical system. The device is formed from a plurality of quantum wells selected to compensate for the increased mode field dimensions.

15 Claims, 6 Drawing Sheets

EXPANDED MODE WAVE GUIDE SEMICONDUCTOR MODULATION

BACKGROUND OF THE INVENTION

1. Field of the Invention

The present invention relates to an electroabsorptive modulator (EAM) more particularly to an EAM in which the optical mode is optimized to minimize the optical insertion losses.

2. Description of the Prior Art

Electroabsorptive modulators (EAM) are known to be used for modulating RF signals. There are many known benefits associated with optical modulation of RF signals including higher frequencies, immunity to electromagnetic interference, and relatively wide band width.

Such EAMs are relatively well known in the art. Examples of such EAM are disclosed in U.S. Pat. Nos. 4,525,687; 4,847,573; 5,107,307; 5,113,283; 5,165,105; 5,402,259; and 5,522,005, all hereby incorporated by reference. Such EAMs are also discussed in the literature— "Theoretical Design Optimization of Multiple Quantum Well Electroabsorption Waveguide Modulators", by N. K. Chin and W. S. C. Chang, *IEE Journal of Quantum Electronics*, Vol. 29, No. 9, Sep. 19, 1993, pgs. 2476–2488.

Such EAMs are typically formed as a semiconductor waveguide on a substrate. For example, as disclosed in U.S. Pat. No. 5,402,259, assigned to the same assignee as the assignee of the present invention, an electroabsorptive modulator is disclosed which includes a semiconductor waveguide formed on a GaAs substrate. The waveguide consists of one or more GaAs quantum wells sandwiched between two AlGaAs waveguide layers. Ohmic contacts are formed on the device to enable the RF signal as well as any DC bias signal to be connected to the device. As discussed in U.S. Pat. No. 5,402,259, the DC bias signal is used to cause the EAM 24 to operate in its linear range. As is known in the art, the electric field causes a change in the optical absorption of the device, which, in turn causes the intensity of the light to be modulated. By applying an RF signal to the device, the intensity modulation of the input light signal will vary in accordance with the variation of the RF signals.

An optical modulation system incorporating an EAM is illustrated in FIG. 1 and generally identified with the reference numeral 20. An optical carrier, for example, from a laser transmitter 22, is directed to input port of the EAM 24. An optical output port of the EAM 24 is directed to a photodiode receiver 26 by way of an optical fiber 28. An RF input signal and a DC bias are applied to the electrical inputs of the EAM. As discussed above, the EAM 24 modulates the optical carrier as a function of the RF input signal. The photodiode receiver 26 demodulates the optical signal to provide an RF output signal. A DC bias signal is used to bias the photodiode 26.

The performance of the optical modulation system 20 is dependent upon the optical power of the modulated light signal directed to the photodiode receiver 26, relative to the optical power of the optical carrier, for example from the laser transmitter 22. The RF gain of the system increases as a function of the square of optical power directed to the photodiode receiver 26. Therefore, in order to improve the performance of the optical modulation system 20, it is necessary to minimize optical insertion losses in the system. In particular, it is necessary to minimize optical insertion losses between the laser transmitter 22 and the output optical fiber 28. Unfortunately in many known EAMs optical mode mismatches exist between the optical fiber 28 and the EAM 24 which result in significant optical insertion losses which decrease the performance of the overall optical modulation system 20. More particularly, known single mode semiconductor waveguides have mode field dimensions which are several microns in the lateral direction (parallel to the epitaxial layers) and significantly smaller dimensions in the transverse direction (perpendicular to the epitaxial layers). However, conventional single mode optical fibers have mode field diameters closer to 10 microns. Such a mismatch in the mode field dimensions results in relatively significant optical insertion losses which degrades the overall performance of the optical modulation system 20.

SUMMARY OF THE INVENTION

It is an object of the present invention to solve various problems in the prior art.

It is yet another object of the present invention to provide an electroabsorptive modulator (EAM) configured to reduce optical insertion losses.

It is yet another object of the present invention to provide an EAM which is optimized to provide minimal optical insertion loss relative to the optical device to which the EAM is connected.

It is yet a further object of the present invention to provide an EAM that is configured to optimize the mode matching between the EAM and the optical device to which the EAM is to be coupled.

Briefly, the present invention relates to an electroabsorptive modulator (EAM) for providing optical modulation of RF inputs signals. The EAM is formed as a semiconductor waveguide on a semiconductor substrate with an optical input port and an optical output port as well as electrical input contacts for connection to the RF input. The configuration of the waveguide portion of the EAM is optimized to provide a modal match with the particular optical device to which the EAM is to be connected, for example, an optical fiber. By optimizing the modal match between the EAM and the optical device to which the EAM is connected, the optical insertion losses are minimized thereby improving the overall performance of the optical system. The waveguide portion of the device is formed from a plurality of quantum wells, selected to compensate for the increased mode field dimensions.

DESCRIPTION OF THE DRAWINGS

These and other objects of the present will be readily understood with reference to the following specification and attached drawings wherein.

DETAILED DESCRIPTION

Figure 1:
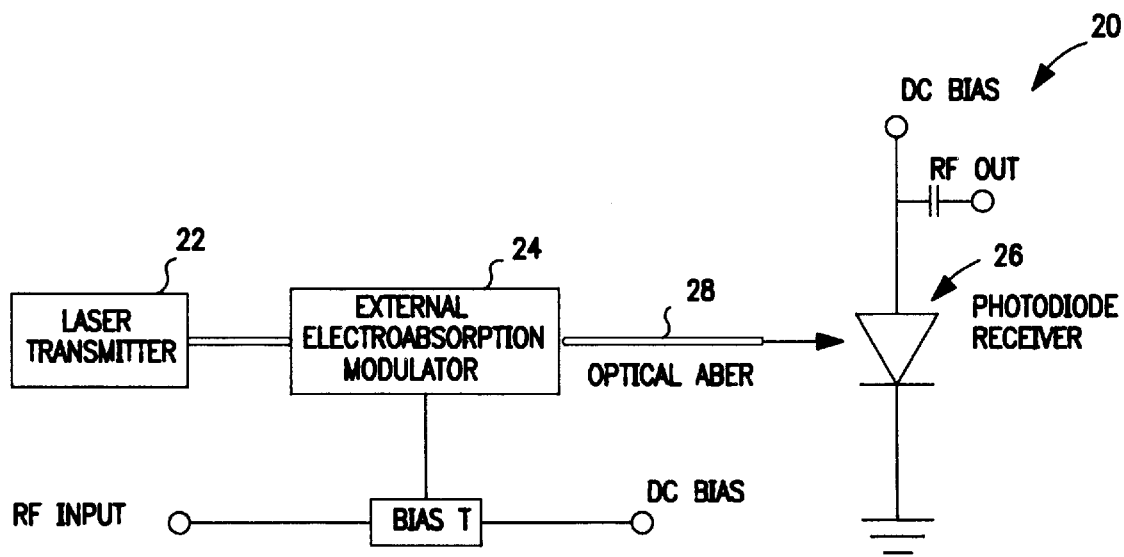
FIG. 1 is a schematic diagram of an optical modulation system.

The present invention relates to an electroabsorptive modulator (EAM) whose configuration is optimized to minimize modal mismatches with the device to which the EAM is connected. By minimizing modal mismatches between the EAM and the device to which the EAM is connected, the optical insertion losses are minimized which improves the overall performance of the optical modulation system. The EAM is described and illustrated below to minimize optical insertion losses in a system, such as illustrated in FIG. 1, in which the EAM is connected to an optical fiber. However, the principles of the present invention are applicable to other systems in which the EAM is connected to an optical device other than an optical fiber, such as to another EAM, or an optical amplifier.

By reducing the optical insertion losses, the optical power of the overall modulation system, for example, as illustrated in FIG. 1, is significantly improved. In particular, in an optical modulation system as illustrated in FIG. 1, the system performance is dependent upon the amount of optical power coupled to the high speed photodiode 26. In such a system, the RF gain of the system increases as the square of the optical power applied to the photodiode 26. Moreover, the spurious free dynamic range in suboctave links (limited by third order intermodulation products) increases about ⅓ dB for every dB increase of optical gain in shot noise limited systems in about ⅔ dB of optical gain in thermal noise limited systems. As such, the EAM in accordance with the present invention reduces the optical insertion loss thereby increasing the optical power delivered to the photodiode 26, which improves the overall system performance of the optical modulation system.

Figure 2:
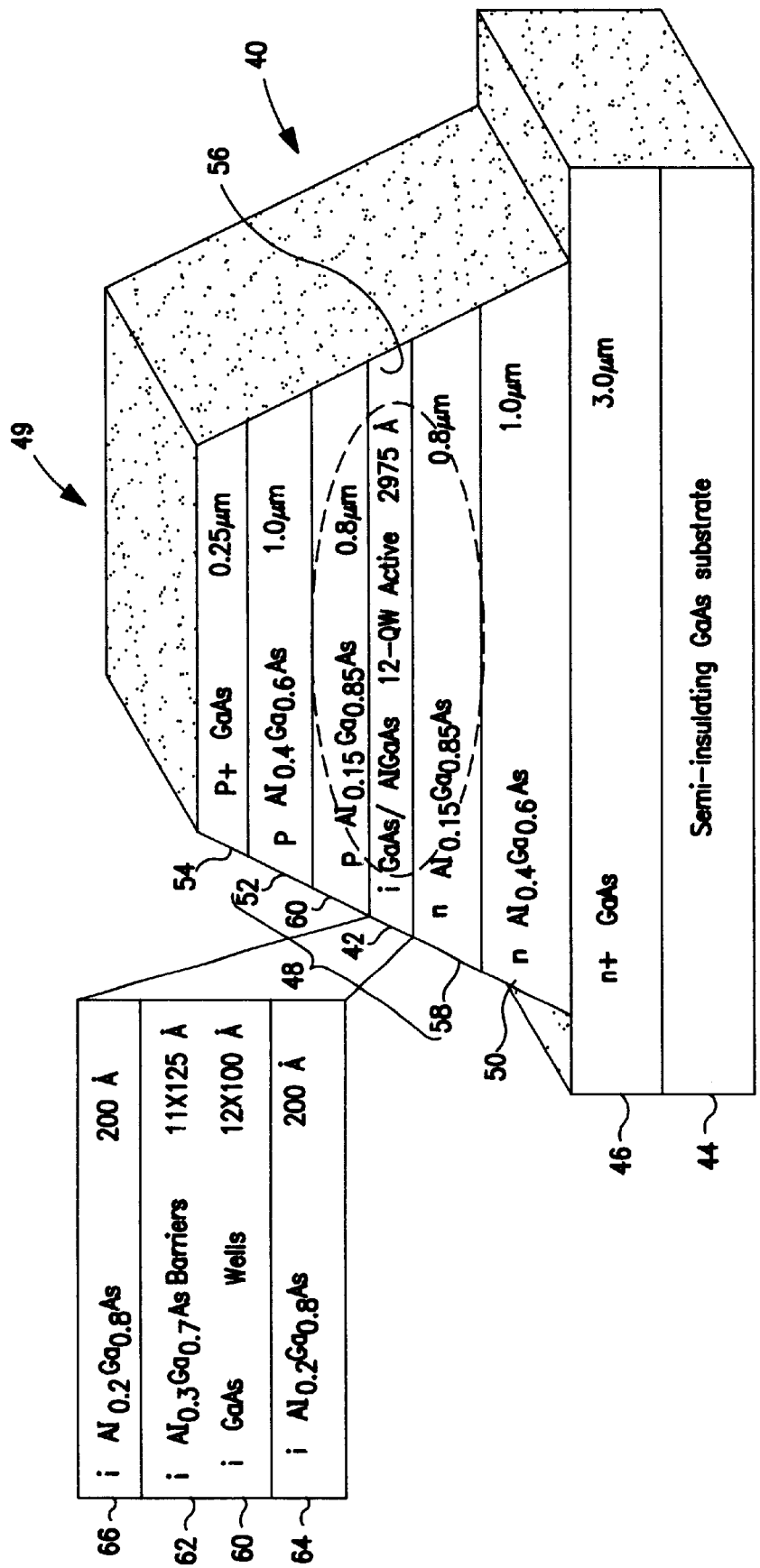
FIG. 2 is a sectional view of an electroabsorptive modulator in accordance with the present invention showing the composition of the intrinsic layer blown up.

An EAM in accordance with the present invention, generally identified with the reference numeral 40 is illustrated in FIG. 2. As mentioned above, the EAM 40 is configured to minimize modal mismatches with a fiber optic cable. In known electroabsorptive modulators, the mode field dimensions are often several microns in the lateral direction and significantly smaller in a transverse direction. However, single mode optical fibers have a mode field diameter of around 10 microns. Such a modal mismatch between the optical fiber and the known EAMs results in a significant optical insertion loss between the optical fiber and the EAM which significantly reduces the optical power of the system as well as the output RF power.

Unlike lasers, whose output modes are determined by the cavity size, the two port nature of the EAM 40 allows its optical output to be configured for a single mode even if the cavity itself supports multiple modes. This is primarily because the input mode to the EAM 40 has a single lobe and, when properly aligned, has poor overlap with the other cavity modes which have minima at the center of the waveguide or have multiple lobes. However, for a given optical input power, the peak field amplitude decreases as the mode size increases which causes a decrease in the overlap between the propagating field and the absorbing quantum wells which results in a decrease in the modulation efficiency of the EAM. In order to compensate for this effect, the number of quantum wells is increased to compensate for the reduced peak field amplitude.

The mode matching of the present invention is accomplished by dimensionally and geometrically matching the various layers of the waveguide portion of the device to match the mode of the device to which the EAM is connected. In the case of a fiber optic cable, because the mode size of the EAM 40 is increased to more closely match the mode of the fiber optic cable, the number of quantum wells is increased to compensate for the increased mode field dimensions in order to obtain an equivalent amount of change in absorption per unit of applied electric field (modulation efficiency). Otherwise, simply increasing the mode size of the EAM would result in a decreased modulation efficiency requiring an increased amount of input RF power to achieve an equivalent amount of output RF power. In general, doubling the mode size of the device provides about half of the modulation efficiency. In a situation where the mode size is doubled, doubling the number of quantum wells provide an equivalent modulation efficiency. In the case of a fiber optic cable connected to the EAM, the number of quantum wells is selected to be 12 to get an equivalent amount of absorption relative to an EAM with a much smaller mode size, for example as disclosed in U.S. Pat. No. 5,402,259, assigned to the same assignee as the assignee of the present invention and hereby incorporated by reference.

The EAM 40 is formed as a semiconductor optical waveguide which includes an intrinsic region 42, which, in turn, includes one or more quantum wells. As is known in the art, quantum well type modulators may be used as intensity type modulators. More particularly, the optical waveguide portion, as will be discussed below, defines an input optical port and an output optical port. An optical carrier, for example, from a laser 22 is applied to the input optical port. A generally perpendicular electric field (i.e., perpendicular to the epitaxial layers) causes the optical absorption of the device to change, which in turn provides for intensity modulation of the optical carrier directed out of the optical output port. By applying RF modulation of the electric field in a direction generally perpendicular to the plane of the epitaxial layers, the EAM 40 will provide an intensity modulated output optical beam which varies according to the characteristics of the RF input signal. As discussed in detail in U.S. Pat. No. 5,402,259, assigned to the same assignee as the assignee of the present invention, hereby incorporated by reference, a DC bias may be applied to the RF input signal to cause the modulator 40 to operate in its linear range.

Referring to FIG. 2, the EAM 40 in accordance with the present invention is illustrated. The EAM 40 includes a semi-insulating substrate 44. The semi-insulating substrate may be formed from GaAs, InP:Fe or other materials. An n+ GaAs layer may be formed above the semi-insulating substrate layer 44. The n+ layer may alternatively be formed from InP or InGaAs. The n+ layer 46 is used as a contact layer. A mesa 49 is formed above the contact layer 46. An optical semiconductor waveguide 48 which includes the layers 42, 58 and 60 is sandwiched between a pair of cladding layers 50 and 52. The cladding layer 50 may be formed as an n-type layer, 1 $\mu$m thick from $Al_{0.4}Ga_{0.6}As$, while the cladding layer 52 may be formed from essentially the same type material but doped with a p-type doping material to form a p+ layer. A p+ contact layer 54 is formed above the buffer layer 52. Ohmic contacts are formed on the contact layers 46 and 54, which, in turn, form the electrical input ports for the RF input.

The optical waveguide 48 is formed as a p-i-n structure 48 which allows for the application of an electric field generally perpendicular to the direction of the plane of the epitaxial layers. In particular, an intrinsic layer 42 is sandwiched between a plurality of doped layers 46, 50, 58, and 52, 54, 60. The layers 58 and 60 serve as optical waveguide layers to optimize the optical coupling and may be formed from $Al_{0.15}Ga_{0.85}As$ to a thickness of about 0.8 μm and doped with either an n-type material or a p-type material as shown in FIG. 2. The active layer 42 is formed with a plurality of quantum wells selected to compensate for the increased mode field dimensions as a result of the modal matching with an optical fiber. Due to the increased mode dimension of the device for modal matching with an optical fiber, the active layer 42 is formed with 12 quantum wells consisting of alternating well layers 60 and barrier layers 62. The alternating well and barrier layers 60 and 62 are sandwiched between a pair of outer barrier layers 64 and 66. The well layers 60 may be formed from GaAs, each formed to a thickness of about 100 Å while the barrier layers 62 may be formed from $Al_{0.3}Ga_{0.7}As$ to a thickness of about 125 Å. Each of the outer barrier layers 64 and 66 may be formed from $Al_{0.2}Ga_{0.8}As$ and formed to be about 200 Å thick.

Figure 8:
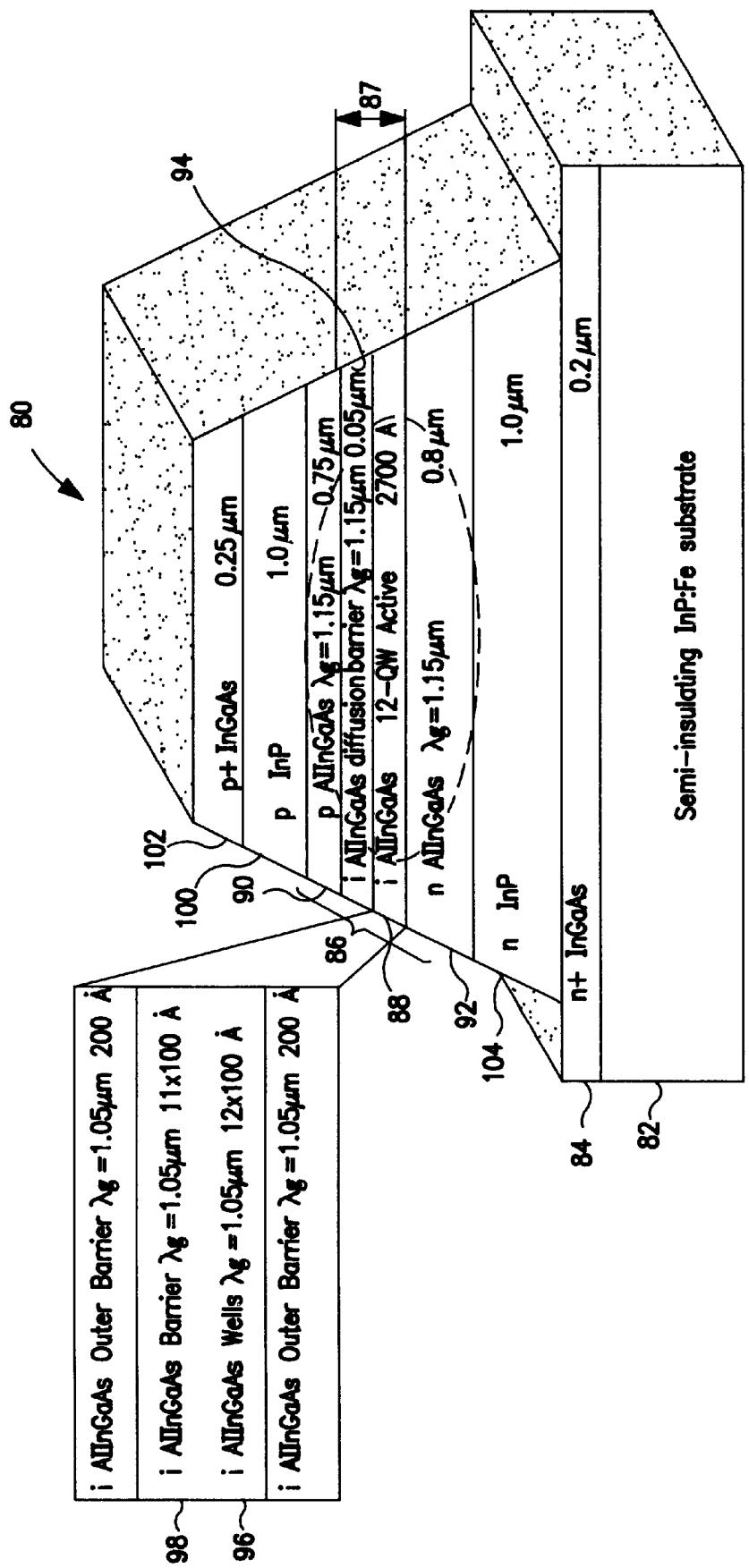
FIG. 8 is another alternate embodiment of the EAM illustrated in FIG. 2.

Another important aspect of the EAM in accordance with the present invention is that the configuration of the device is optimized to provide acceptable bandwidth and modulation efficiency even though the thickness of the intrinsic region 56 is being increased in order to reduce the parasitic capacitance and improve the bandwidth. In particular, the quantum well type modulator acts as a parallel plate capacitor. Thus, as the thickness of the intrinsic region 56 increases, the capacitance decreases thereby increasing the bandwidth of the overall device. In order to minimize the capacitance and thus increase the bandwidth of the device, the thickness of the intrinsic region 56 is increased. As used herein the intrinsic region 56 relates to an undoped region of the device. As shown in FIG. 8, an alternate embodiment of the EAM illustrated in FIG. 2 is shown and generally identified with the reference number 40'. In this embodiment, the intrinsic or undoped region 56' may encompass the active layer (i.e., quantum well layer 42') as well as other undoped layers.

Figure 3:
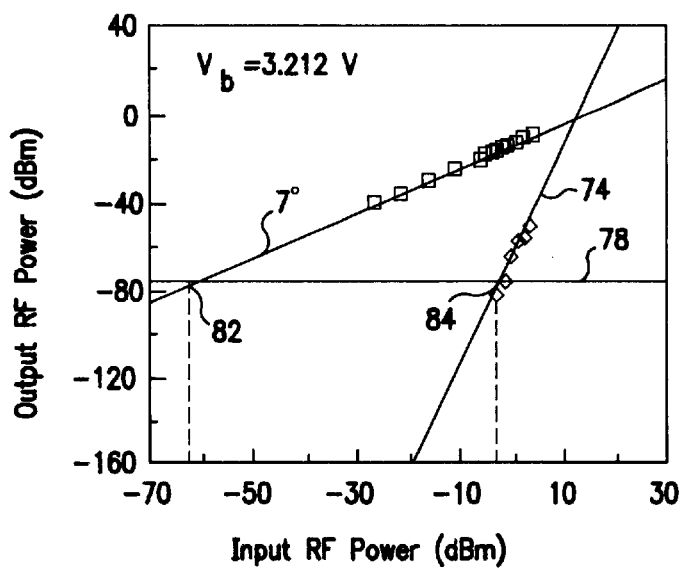
FIG. 3 is a graphical illustration of the RF output power as a function of the RF input power illustrating the dynamic range of the modulator at a first bias voltage.
Figure 4:
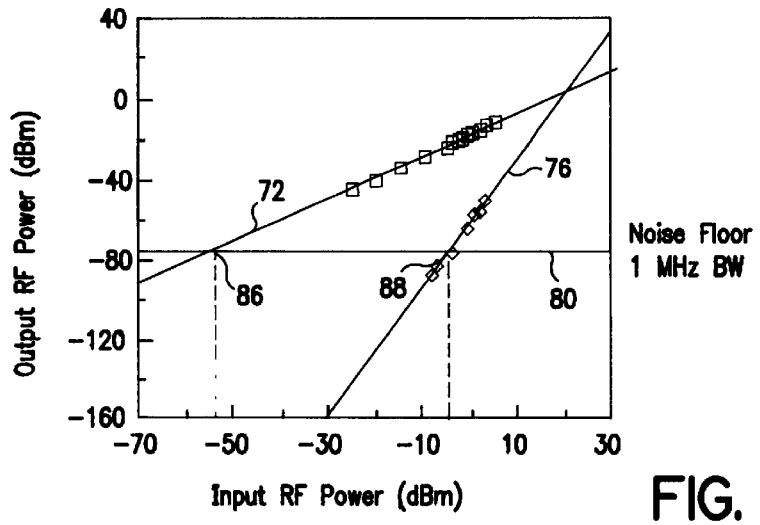
FIG. 4 is similar to FIG. 3 for a different bias voltage.

FIGS. 3 and 4 illustrate the RF output power (dBm) as a function of RF input power (dBm) for different bias voltages The difference in dynamic ranges at the two bias voltages illustrates the manner in which the bias voltage may be adjusted for optimum linked dynamic range as set forth in U.S. Pat. No. 5,402,259 assigned to the same assignee as the present invention. The curves 70 and 72 illustrate the signal curves while the curves 74 and 76 represent distortion. The noise floor is illustrated by the horizontal line 78 and 80. The dynamic range is thus determined the intersection points 82, 84, 86 and 88 of the curves 70, 72, 74, and 76 with noise floor 78 and 80.

Figure 5:
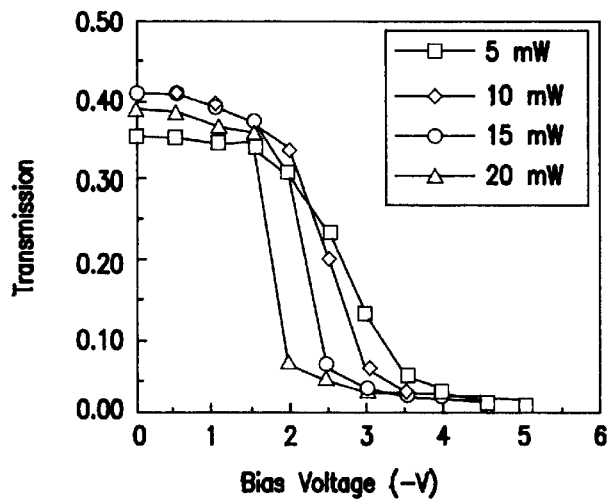
FIG. 5 is a graphical illustration of the optical transmission as a function of the DC bias voltage for different input optical power levels.
Figure 6:
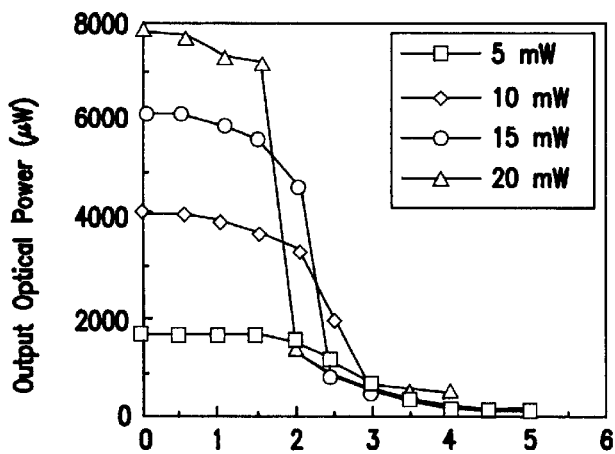
FIG. 6 is a graphical illustration of the output optical power as a function of the DC bias voltage for different input optical power levels.
Figure 7:
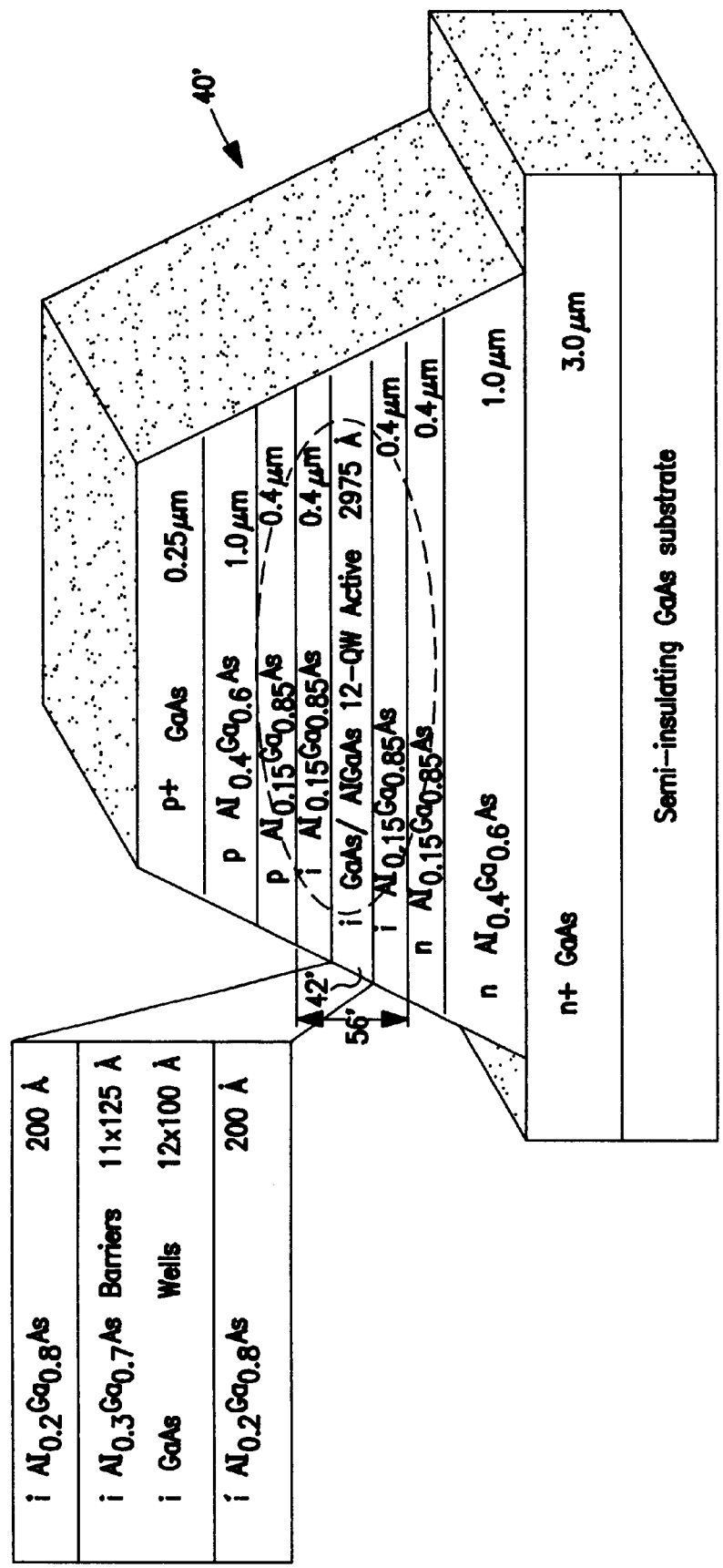
FIG. 7 is an alternate embodiment of the EAM illustrated in FIG. 2.

FIGS. 5 and 6 are graphical illustrations of the transmission and output optical power of the device as a function of the bias voltage for different optical input power levels. As shown, the optical transmission and optical output power of the EAM in accordance with the present invention is much higher relative to known EAMS, such as the EAM disclosed in U.S. Pat. No. 5,402,259, assigned to the same assignee as the present invention.

Another alternate embodiment of the invention is illustrated in FIG. 8. In this embodiment, similar to the embodiment illustrated in FIG. 2, the configuration of the optical waveguide is optimized to minimize the modal mismatch between the EAM 80 and the device to which the EAM 80 is connected. In this embodiment the optical waveguide is formed on an InP:Fe semiconducting substrate 82. A contact layer 84 is formed on top of the substrate layer 82. The contact layer 84 may be formed as an n+ layer and formed from InGaAs. The optical waveguide, generally identified with the reference numeral 86, includes a plurality, for example, 12, quantum well layers forming an active layer 88 sandwiched between a p waveguide layer 90 and an n waveguide layer 92. In order to prevent dopant from diffusing into the intrinsic region 87, a diffusion barrier 94 is formed between the p waveguide 90 and the intrinsic region 88. The n waveguide layer 92 may be formed from AlGaInAs to a thickness of 0.8 μm having a 1.15 μm bandgap. The p waveguide layer 90 may be formed from AlGaInAs to a thickness of 0.8 μm with a 1.15 micron bandgap. The diffusion barrier layer 94 may be formed from AlGaInAs to a thickness of 0.05 μm with a 1.05 μm bandgap. The intrinsic layer 88 may be formed from 12 alternating quantum well 96 and barrier layers 98. Each quantum well layer may be formed from AlGaInAs having a thickness of 0.01 μm with a bandgap corresponding to an optical emission of 1.25 μm. Each of the barrier layers 98 may be formed from AlGaInAs having a thickness of 0.01 μm with a bandgap corresponding to an optical emission of 1.05 μm. A cladding layer 100 may be formed on top of the p waveguide layer 90. The cladding layer 100 may be formed from InP and doped to form a p layer to a doping concentration of $3 \times 10^{17}$. The cladding layer 100 may be formed to be 1.0 μm thick. A contact layer 102 may be formed on top of the cladding layer 100. The contact layer 102 may be formed from InGaAs and doped with a concentration of $1 \times 10^{19}$ to form a p+ layer with a thickness for example 0.2 μm. An n doped cladding layer 104 may be formed over the contact layer.

The EAMs 40, 40' and 80 may be formed on the respective substrates by metal organic chemical vapor deposition (MOCVD), molecular beam epitaxy (MBE) chemical beam epitaxy (CBE) or other techniques. The contacts formed on the respective contact layers may be formed by metal deposition and photolithographic techniques. The configuration of the mesa for the EAMs 40, 40' and 80 may be formed by known etching and photolithographic techniques.

Figure 9:
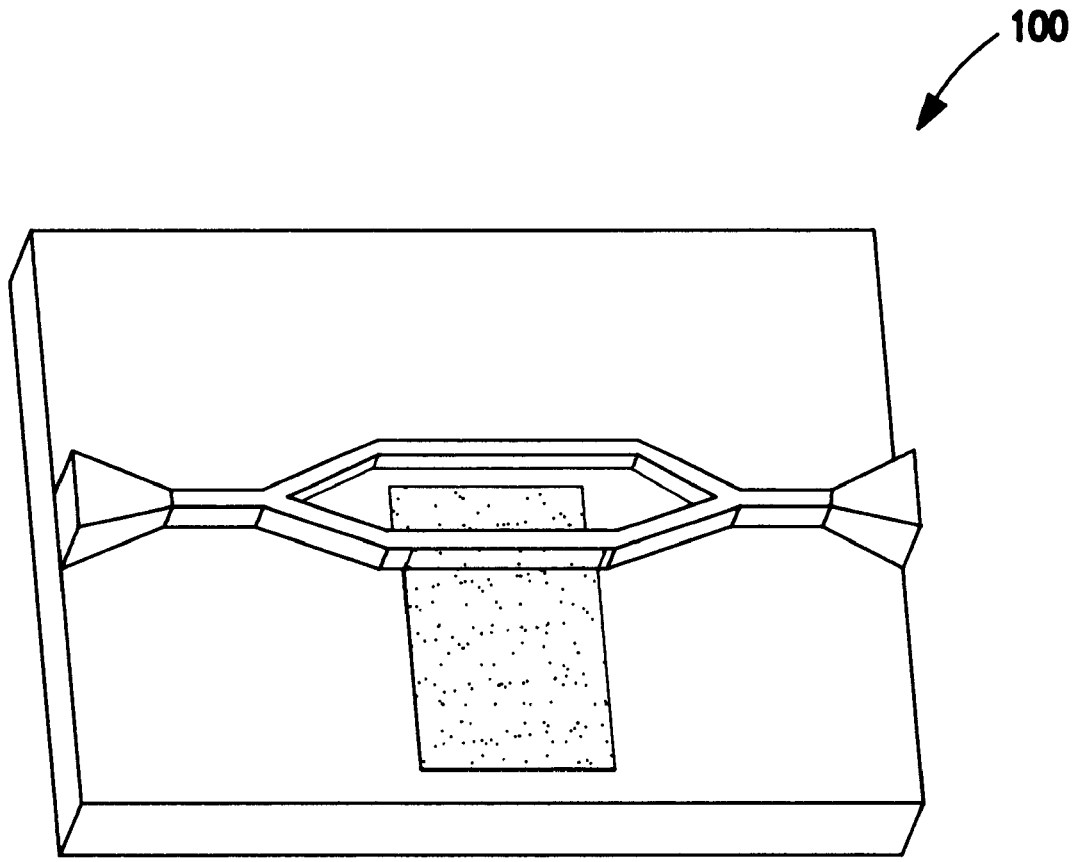
FIG. 9 is a Mach-Zehnder modulator in accordance with the present invention.

The principles of the invention may also be applied to other electro-optical devices, such as a semiconductor Mach-Zehnder modulator 100 as illustrated in FIG. 9. In particular, the modulator 100 is configured with optical input and output ports as discussed above but tapered down to a single mode structure for the Y branches and the application of the electric field as illustrated. The tapering of the device may be achieved by selective area epitaxy in metal organic vapor deposition (MOCVD). Otherwise, the required bends could introduce significant mode coupling resulting in multiple mode output and relatively poor coupling to the optical fiber.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An electroabsortive modulator (EAM) adapted to be optically coupled to a predetermined single mode optical device, the EAM comprising:

a substrate;

an optical waveguide formed above said substrate, the optical waveguide formed with an active layer and waveguide layers, said active layer having a predetermined number of quantum wells, said optical waveguide being configured with increased field dimensions to substantially match the dimensions of said predetermined single mode optical device relative to said single mode dimensions for said EAM to minimize the modal mismatch between the EAM and said predetermined optical device, said predetermined number of quantum wells being increased relative to the number of quantum wells for single mode field dimensions to compensate for the increased insertions loss resulting from said increased field dimensions.

2. The EAM as recited in claim 1, wherein said predetermined optical device is an optical fiber.

3. The EAM as recited in claim 1, wherein said predetermined number of quantum wells is 12.

4. The EAM as recited in claim 1, wherein the active layer is undoped and includes a predetermined number of quantum wells sandwiched between a pair of oppositely doped waveguide layers.

5. The EAM as recited in claim 4, further including a diffusion layer disposed between said active layer and one of said pair of oppositely doped waveguide layers.

6. The EAM as recited in claim 1, wherein said optical waveguide further includes cladding layers, said optical waveguide sandwiched between said cladding layers.

7. The EAM as recited in claim 1, further including an intrinsic region disposed adjacent said active region.

8. The EAM as recited in claim 1, further including a first contact layer disposed adjacent one of said cladding layers.

9. The EAM as recited in claim 8 further including a second contact layer disposed adjacent the other of said cladding layers.

10. The EAM as recited in claim 1 wherein said substrate is GaAs.

11. The EAM as recited in claim 1, wherein said substrate is InP.

12. A method for forming an electroabsorptive modulator (EAM) with reduced optical insertion losses comprising the steps of:

(a) providing a substrate;

(b) forming an optical waveguide on said substrate, said optical waveguide configured to match the field dimensions of the optical device to which the EAM is to be connected; and compensating for increased insertion losses resulting from the increased field dimensions of said EAM by forming said optical waveguide with an increased number of quantum wells relative to the number of quantum wells for single mode field dimensions, the increased number of quantum wells selected to compensate for the increased insertion loss resulting from said increased field dimensions.

13. The method as recited in claim 12, wherein the number of quantum wells is selected to get a predetermined modulation efficiency.

14. An electro-optic device adapted to be optically coupled to a predetermined single mode optical device, the electro-optical device comprising:

a semiconductor electro-optic device, said device configured to minimize the modal mismatch with said predetermined optical device, wherein said semiconductor optical device is provided with increased field dimensions to substantially match the field dimensions of said predetermined optical device, said semiconductor electro-optical device being provided with increased number quantum wells relative to the number of quantum wells for single mode field dimensions, the increased number of said quantum wells selected to compensate for the increased insertion loss resulting from the increased field dimensions of said electro-optic device relative to the single mode dimensions of said electro-optic device.

15. The electro-optic device as recited in claim 14, wherein said semiconductor electro-optical device is a Mach-Zehnder modulator.

* * * * *